United States Patent
Hanson et al.

(10) Patent No.: US 9,587,943 B2
(45) Date of Patent: Mar. 7, 2017

(54) HIGH RATE ROTATION SENSING

(71) Applicant: Honeywell International Inc., Morristown, NJ (US)

(72) Inventors: Timothy J. Hanson, Plymouth, MN (US); Terrance Troske, White Bear Lake, MN (US); David S. Willits, Long Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 143 days.

(21) Appl. No.: 14/608,957

(22) Filed: Jan. 29, 2015

(65) Prior Publication Data

US 2016/0097640 A1 Apr. 7, 2016

Related U.S. Application Data

(60) Provisional application No. 62/059,878, filed on Oct. 4, 2014.

(51) Int. Cl.

| | |
|---|---|
| *G01C 19/34* | (2006.01) |
| *G01C 19/44* | (2006.01) |
| *G01C 19/42* | (2006.01) |
| *G01C 19/00* | (2013.01) |
| *G01C 21/16* | (2006.01) |

(52) U.S. Cl.
CPC ............ *G01C 19/34* (2013.01); *G01C 19/00* (2013.01); *G01C 19/42* (2013.01); *G01C 19/44* (2013.01); *G01C 21/16* (2013.01)

(58) Field of Classification Search
CPC ......... G01P 15/18; G01P 1/023; G01C 21/16; G01C 19/42; G01C 19/5776; G01C 19/5705; G01C 19/34

USPC .................... 73/510, 511, 493, 431
See application file for complete search history.

(56) References Cited

U.S. PATENT DOCUMENTS

| | | | |
|---|---|---|---|
| 4,179,818 A | 12/1979 | Craig | |
| 4,212,443 A * | 7/1980 | Duncan | G01C 21/16 244/165 |
| 4,262,861 A | 4/1981 | Goldstein | |

(Continued)

FOREIGN PATENT DOCUMENTS

WO 2010088119 8/2010

OTHER PUBLICATIONS

European Patent Office, "Extended European Search Report from EP application No. 15188019.2", "from foreign counterpart of U.S. Appl. No. 14/608,957", Mar. 1, 2016, pp. 1-8, Published in: EP.

*Primary Examiner* — Helen Kwok
(74) *Attorney, Agent, or Firm* — Fogg & Powers LLC (57) ABSTRACT

One embodiment is directed towards an inertial measurement unit (IMU) for measuring an input rate of rotation about an input axis. The IMU includes a first three dimensional gyroscope disposed such that a first axis of its three axes is oriented at a skew angle in degrees away from a reference plane, wherein the reference plane is normal to the input axis. The IMU also includes one or more processing devices coupled to the first gyroscope. The IMU also includes one or more data storage devices coupled to the one or more processing devices, the one or more data storage devices including instructions which, when executed by the one or more processing devices, cause the one or more processing devices to calculate the input rate of rotation based on dividing a sensed rate of rotation about the first axis by the sine of the skew angle.

15 Claims, 4 Drawing Sheets

(56) References Cited

U.S. PATENT DOCUMENTS

| | | | |
|---|---|---|---|
| 4,280,188 A | 7/1981 | Weinstein et al. | |
| 4,821,572 A * | 4/1989 | Hulsing, II | G01C 19/5776 73/504.04 |
| 4,914,598 A * | 4/1990 | Krogmann | G01C 21/16 244/177 |
| 5,012,424 A * | 4/1991 | Dodson | G01C 25/005 342/450 |
| 5,363,700 A * | 11/1994 | Joly | G01P 15/18 73/431 |
| 6,925,413 B2 * | 8/2005 | Krieg | B60R 21/0132 702/152 |
| 7,370,530 B2 * | 5/2008 | DCamp | B81B 7/0074 257/E25.01 |
| 7,661,312 B2 * | 2/2010 | Dukich | G01C 19/00 73/493 |
| 7,814,793 B2 | 10/2010 | Sato | |
| 8,239,162 B2 * | 8/2012 | Tanenhaus | G01C 21/16 702/145 |
| 8,467,964 B2 * | 6/2013 | Harrat | G01S 5/0072 701/520 |
| 2002/0165688 A1 * | 11/2002 | Hermann | G01C 21/16 702/153 |
| 2007/0214886 A1 * | 9/2007 | Sheynblat | G01P 15/18 73/509 |
| 2008/0134784 A1 * | 6/2008 | Jeng | G01P 15/18 73/514.01 |
| 2008/0148850 A1 * | 6/2008 | Hanson | G01C 21/16 73/514.16 |
| 2008/0212870 A1 * | 9/2008 | Tan | G01C 11/00 382/154 |
| 2011/0313703 A1 * | 12/2011 | Petillon | G01C 19/34 702/96 |
| 2012/0191397 A1 * | 7/2012 | Eatwell | A61B 5/11 702/94 |
| 2012/0203487 A1 * | 8/2012 | Johnson | G01P 21/00 702/104 |
| 2012/0278023 A1 * | 11/2012 | Han | A61B 5/11 702/87 |
| 2013/0245982 A1 * | 9/2013 | Buchanan | G01C 19/00 702/93 |
| 2015/0088419 A1 * | 3/2015 | Bhardwaj | G01C 21/165 701/472 |
| 2015/0374563 A1 * | 12/2015 | Mussa-Ivaldi | A61G 5/024 701/22 |

* cited by examiner

HIGH RATE ROTATION SENSING

CROSS-REFERENCE TO RELATED APPLICATIONS

This application claims the benefit of U.S. Provisional Patent Application Ser. No. 62/059,878, filed on Oct. 4, 2014, which is hereby incorporated herein by reference.

BACKGROUND

A three dimensional gyroscope is capable of measuring rotation about each of a roll, pitch, and yaw coordinate axis. Such a three dimensional gyroscope has a given operational range for the rate of rotation that can be measured in each of the three axes. In some such gyroscopes, the operational range can be selected by the user through a configuration change (e.g., programming) of the gyroscope. Regardless of whether the gyroscope has multiple configurations or a single configuration, in a given configuration, the gyroscope is rated to sense a maximum rate of rotation about each of the roll, pitch, and yaw axes. For example, one gyroscope is rated to sense up to 2000 degrees per second (dps) about a roll axis, 2000 dps about a pitch axis, and 2000 dps about a yaw axis. Notably, the roll, pitch, and yaw axis are axes in relation to the gyroscope itself.

SUMMARY

One embodiment is directed towards an inertial measurement unit (IMU) for measuring an input rate of rotation about an input axis. The IMU includes a first three dimensional gyroscope, the first gyroscope configured to sense rotation about a first set of three mutually orthogonal axes, wherein the first gyroscope is disposed such that a first axis of the first set of three axes is oriented at a skew angle in degrees away from a reference plane, the reference plane normal to the input axis. The IMU also includes one or more processing devices coupled to the first gyroscope. The IMU also includes one or more data storage devices coupled to the one or more processing devices, the one or more data storage devices including instructions which, when executed by the one or more processing devices, cause the one or more processing devices to calculate the input rate of rotation based on dividing a sensed rate of rotation about the first axis by the sine of the skew angle.

DRAWINGS

The following exemplary figures are intended to aid the understanding of the written description of the exemplary embodiments and should not be considered limiting in scope.

In accordance with common practice, the various displayed features are not necessarily drawn to scale but are drawn to emphasize specific features relevant to the exemplary embodiments.

DETAILED DESCRIPTION

The subject matter described herein provides for an inertial measurement unit (IMU) configured to use one or more gyroscopes in a manner that enables the IMU to determine a rotation rate higher than the maximum rated rotation rate of the one or more gyroscopes.

Figure 1:
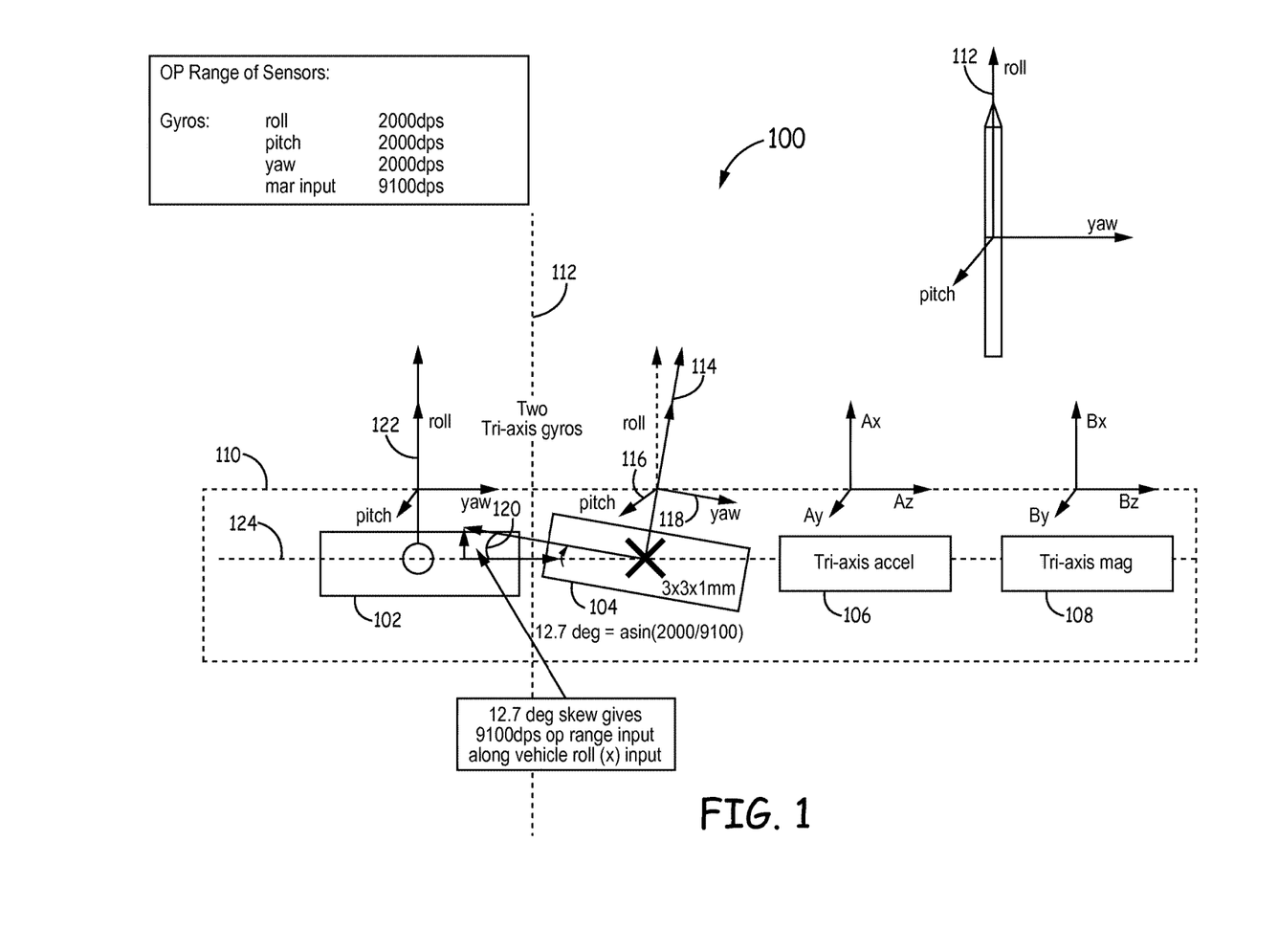
FIG. 1 is a block diagram of an example inertial measurement unit (IMU) having a skewed gyroscope for high rate rotation sensing.

FIG. 1 is a cross-sectional view of an example of such an IMU 100. The IMU 100 includes two gyroscopes 102, 104, an accelerometer 106, and a magnetometer 108. In an example, each of the sensors 102, 104, 106, 108 is a three dimensional (i.e., tri-axis) sensor configured to sense the respective phenomena about each of three mutually orthogonal axes. In any case, however, at least one of the gyroscopes 102, 104 is a three dimensional gyroscope configured to sense rotation about each of a roll, pitch, and yaw axis. In an example, each of the sensors 102, 104, 106, 108 is disposed within a die that is mounted to a printed circuit board (not shown). Such a die could be mounted to the circuit board by being attached directly to the circuit board or the die could be attached to an intermediate member, such as a leadless chip carrier (LCC) or land grid array (LGA), which is in turn attached to the circuit board. The printed circuit board is mounted in a housing 110 for the IMU 100. In an example, the gyroscopes are MEMS based gyroscopes, however, in other examples other types of gyroscopes can be used.

As shown in FIG. 1, a second gyroscope 104 is disposed in a skewed relationship with respect to an input axis 112 about which a high rate rotation is desired to be measured. The skewed relationship of the second gyroscope 104 enables the IMU to measure a rate of rotation about the input axis 112 that is higher than the maximum rotation rate in which the second gyroscope 104 is rated to sense. For example, if the second gyroscope 104 is rated (in its configuration being used) to sense a maximum rate of rotation about its roll axis 114 of 2000 degrees per second (dps), a maximum rate of rotation about its pitch axis 116 of 2000 dps, and a maximum rate of rotation about its yaw axis 118 of 2000 dps, the second gyroscope 104 can be skewed with respect to the input axis 112 to enable the IMU 100 to measure a rate of rotation about the input axis 112 of 9100 dps. The values of 2000 dps and 9100 dps are only examples, gyroscopes having other maximum rates of rotation and other IMU measured rates of rotation can also be used.

Skewing enables the higher rate of rotation to be measured by enabling rotation about the input axis 112 to be sensed by either the pitch axis 116, the yaw axis 118, or both axes 116, 118. In an example, the second gyroscope 104 is disposed such that a first axis 118 is oriented as a skew angle 120 away from a reference plane 124, wherein the reference plane 124 is a plane that is normal to the input axis 112. As an example, the first axis is described and shown herein as the yaw axis 118, however, it should be understood that any axis 114, 116, or 118 of the second gyroscope 104 that is appropriately oriented can be used. For clarity herein, the skew angle 120 is referred to as an angle in degrees; however, calculations can be performed using radians with corresponding adjustments therefore. Moreover, it should be understood that the skew angle 120 can refer to an angle on either side (e.g., above or below) the reference plane 124.

The skew angle 120, with which yaw axis 118 is skewed with respect to the reference plane 124, is selected to be within a range of angles that enables the desired rate of rotation (e.g., 9100 dps) about the input axis 112 to be measured. As mentioned above, the skew angle 120 is the angle between the reference plane 124, which is normal to the input axis 112, and an axis of the second gyroscope 104, in this example, the yaw axis 118. If the second gyroscope 104 were not skewed at all (the skew angle 120 was 0 degrees), the roll axis 114 would be parallel with the input axis 112, and the yaw axis 118 and pitch axis 116 would be parallel with the reference plane 124. In a non-skewed orientation, the second gyroscope 104 can sense rotation about the input axis 112 in the roll axis 114, but cannot sense rotation about the input axis 112 with either the pitch axis 116 or the yaw axis 118. Additionally, since the roll axis 114 is parallel with the input axis 112 in a non-skewed orientation, the maximum rate of rotation that can be measured with the second gyroscope 104 is the maximum rated rate of rotation for the roll axis 114.

If the second gyroscope 104 is skewed with respect to the input axis 112 however, rotation about the input axis 112 can be sensed with either or both of the pitch axis 116 and the yaw axis 118 in addition to the roll axis 114. In the example shown in FIG. 1, the second gyroscope 104 is oriented such that the yaw axis 118 is at the skew angle 120 away from the reference plane 124 and, accordingly, can sense rotation about the input axis 112. In this example, however, the pitch axis 116 is oriented in parallel with the reference plane 124 and, accordingly, cannot sense rotation about the input axis 112. The pitch axis 116 cannot sense rotation about the input axis 112 in this example because the pitch axis 116 is perpendicular to the input axis 112. The yaw axis 118, however, is not perpendicular with the input axis 112. Therefore, of the rotation sensed by the yaw axis 118, a portion corresponds to the rotation about the input axis 112. The IMU 100 is configured to calculate the portion of the rotation sensed by the yaw axis 118 of the second gyroscope 104 that corresponds to the input axis 112. Based on this calculation, the IMU 100 can determine the rate of rotation about the input axis 112 based on the rotation sensed by the second gyroscope 104 about its yaw axis 118.

The skew angle 120 can be selected from an angle greater than zero degrees (at zero degrees the yaw axis 118 is in parallel with the reference plane 124 up to and including a maximum skew, wherein the maximum skew is the arcsine of a skew constant, wherein skew constant is equal to the maximum rated rate of rotation that the second gyroscope 104 can sense about the yaw axis 118 divided by the maximum desired rate of rotation to be measured about the input axis 112. In the example discussed above, the maximum rated rotation rate that the second gyroscope 104 can sense about the yaw axis 118 is 2000 dps and the maximum desired rate of rotation to be measured about the input axis 112 is 9100 dps. Accordingly, the maximum skew is the arcsine of 2000/9100, which is about 12.7 degrees. Given this example operational range of the second gyroscope 104, if the yaw axis 118 is more than 12.7 degrees away from the reference plane 124, the maximum rate measureable by the IMU 100 will be less than 9100 dps. Accordingly, in this example, the skew angle 120 can be an angle greater than zero, up to and including 12.7 degrees. If the skew angle 120 is less than 12.7 degrees, the IMU 100 will be able to measure a maximum rate of more than 9100 dps, however, the sensitivity of the measurement will be reduced the closer the skew angle is to zero. In an implementation of such an example, the skew angle 120 for the second gyroscope 104 is set at the maximum skew (e.g., 12.7 degrees).

The skew angle 120 for the second gyroscope 104 can be achieved by mounting the second gyroscope 104 at an angle (the skew angle 120) with respect to the printed circuit board to which the second gyroscope 104 is mounted. The printed circuit board can then be mounted in the housing 110 in a typical manner such that the printed circuit board is parallel with the reference plane 124. In such a mounting, the input axis 112 extends normally through the printed circuit board and typically the IMU 100 as a whole and the second gyroscope 104 is oriented at the skew angle 120 with respect to the printed circuit board. In particular, the orientation of the second gyroscope 104 can be selected such that the pitch axis 116 is perpendicular to the input axis 112 and the yaw axis 118 is skewed with respect to the printed circuit board by the skew angle 120. Such an angled mounting of the second gyroscope 104 can be achieved by disposing a wedge between the second gyroscope 104 and the printed circuit board. In an alternative example, the second gyroscope 104 can be oriented at the skew angle 120 by mounting the second gyroscope 104 to the printed circuit board in a normal manner (i.e., parallel to the printed circuit board), and mounting the printed circuit board in the housing 110 at the skew angle 120 with respect to the housing 110.

In an alternative example, the second gyroscope 104 can be disposed such that both the yaw axis 118 and the pitch axis 116 are oriented at the skew angle 120 with respect to the reference plane 124. Such an orientation can be achieved in any of the manners discussed above, such as by disposing a wedge between the second gyroscope 104 and the printed circuit board or by skewing the printed circuit board with respect to the housing 110. In such an orientation, a portion of the rotation sensed by the pitch axis 116 corresponds to the rotation about the input axis 112. The IMU 100 is configured to calculate the portion of the rotation sensed by the pitch axis 116 of the second gyroscope 104 that corresponds to the input axis 112. For clarity, the portion of the rotation sensed by the yaw axis 118 that corresponds to rotation about the input axis 112 as calculated by the IMU 100 can be referred to as a first rate of rotation, and the portion of rotation sensed by the pitch axis 116 that corresponds to rotation about the input axis 112 as calculated by the IMU 100 can be referred to as a second rate of rotation. In examples where both the pitch axis 116 and the yaw axis 118 are oriented at the skew angle 120, the IMU 100 can determine the rate of rotation about the input axis 112 based on both the first rate of rotation and the second rate of rotation. In particular, the IMU 100 can be configured to combine (e.g., average) the first rate of rotation with the second rate of rotation improve the signal to noise ratio of the rate of rotation determination about the input axis 112.

In a first implementation of an example where both the pitch axis 116 and the yaw axis 118 are oriented at the skew angle 120, the second gyroscope 104 is disposed such that both the pitch axis 116 and the yaw axis 118 are disposed on the same side (e.g., above) the reference plane 124. In a second implementation of an example where both the pitch axis 116 and the yaw axis 118 are oriented at the skew angle 120, the second gyroscope die is disposed such that one of the pitch axis 116 or yaw axis 118 is disposed on one side (e.g., above) the reference plane 124 and the other axis (yaw 118 or pitch 116) is disposed on the other side (e.g., below) the reference plane 124. Such an orientation having the respective axes 116, 118 on either side of the reference plane 124 may enable some common mode errors to be cancelled out when combining the first rate of rotation with the second rate of rotation.

In the example shown in FIG. 1, the first gyroscope 102 is oriented such that one of its axes 122 is substantially parallel to the input axis 112. The first gyroscope 102 can be mounted in any suitable manner to achieve this orientation. For example, if the printed circuit board is disposed in the IMU 100 such that the input axis 112 extends normally through the IMU 100 and the printed circuit board, the first gyroscope 102 can be mounted normally onto (i.e., parallel to) a surface of the printed circuit board.

Figure 2:
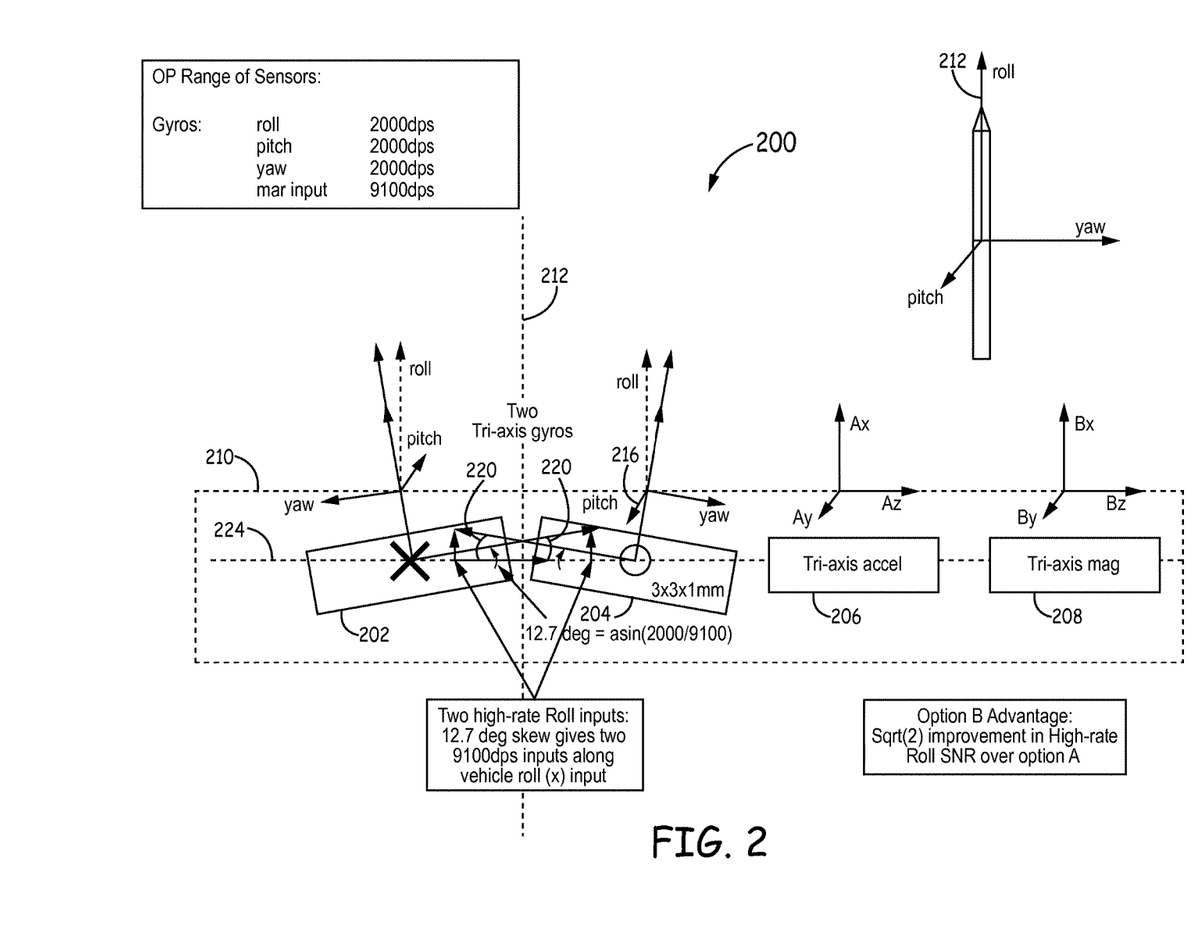
FIG. 2 is a block diagram of another example IMU having two skewed gyroscopes for high rate rotation sensing.

FIG. 2 is a cross-sectional view of another example IMU 200 having two gyroscopes 202, 204, an accelerometer 206, and a magnetometer 208. In an example, each of the sensors 202, 204, 206, and 208 is a three dimensional sensor configured to sense the respective phenomena about each of three mutually orthogonal axes. In any case, however, the two gyroscopes 202, 204 are three dimensional gyroscopes configured to sense rotation about each of a roll, pitch, and yaw axis. In an example, each of the sensors 202, 204, 206, 208 is a die and is mounted to a printed circuit board (not shown) in any of the manners described above with respect to FIG. 1. The printed circuit board is mounted in a housing 210 for the IMU 200.

Similar to the example shown in FIG. 1, a second gyroscope 204 is skewed with respect to an input axis 212, wherein the input axis 212 is an axis about which a desired high rate of rotation is to be measured by the IMU 200. The second gyroscope 204 can be skewed in the same manner as discussed above with respect to the second gyroscope 104. In the example shown in FIG. 2, however, a first gyroscope 202 is also skewed with respect to the input axis 212. The first gyroscope 202 can be skewed in the same manner as the second gyroscope 204. Accordingly, if the first and second gyroscope dies 202, 204 have a maximum rated rate of rotation that can be sensed about their respective yaw axis of 2000 dps and the desired maximum rate of rotation to be measured about the input axis 212 is 9100 dps, the first and second gyroscope dies 202, 204 can be disposed such that their respective yaw axes have a skew angle 220 of 12.7 degrees with respect to a reference plane 224, wherein the reference plane 224 is normal to the input axis 112. With more than one gyroscope 202, 204 disposed at the skew angle 220 with respect to the input axis 212, the IMU 200 can be configured to combine (e.g., average) the component of each (e.g., the two) yaw axis sensed by the respective gyroscope 202, 204 to improve a signal-to-noise ratio of the measurement.

In an example, the first gyroscope 202 and the second gyroscope 204 can be disposed such that their respective yaw axes are parallel with one another. In another example, the yaw axis of the first gyroscope 202 can be oriented in a different direction than the yaw axis 218 of the second gyroscope 204, while both yaw axes are oriented at the skew angle 220. Orienting the gyroscopes 202, 204 in different directions can enable the IMU 100 to identify and filter out common mode noise in the signals from the gyroscopes 202, 204. To aid in the ability to filter out common mode noise in the signals, in an implementation, the multiple (e.g., two) gyroscopes 202, 204 are substantially identical. In an implementation of the example where the multiple gyroscopes 202, 204 are oriented in different directions, the first gyroscope 202 is rotated 180 degrees with respect to the second gyroscope 204 such that the positive yaw axis of the first gyroscope 220 points generally (notwithstanding the skew angles 220) in the opposite direction from the positive yaw axis of the second gyroscope 204. Such an implementation is illustrated in FIG. 2.

In some examples, two axes (e.g., the pitch and yaw axes) of one or more of the multiple gyroscopes 202, 204 can be oriented at the skew angle 220 with respect to the reference plane 224 in the same manner as discussed above with respect to the second gyroscope 104.

The first and second gyroscopes 202, 204 can be oriented at the skew angle 220 in any of the manners discussed above with respect to orienting the second gyroscope 104 at the skew angle 120. For example, a wedge can be placed beneath one or both of the gyroscopes 202, 204 and/or the printed circuit board to which the gyroscopes 202, 204 are mounted can be oriented at an angle with respect to the housing 210. In other examples more than two gyroscopes can be oriented at the skew angle 220 with respect to the input axis 212 and the IMU 200 can be configured to combine (e.g., average) the outputs from each of the more than two gyroscope dies accordingly.

Figure 3A:
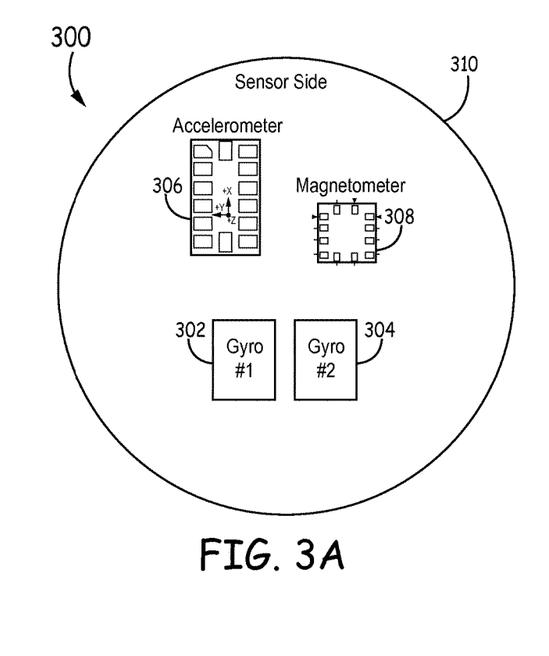
FIGS. 3A-3C are respective views of the IMU of FIG. 1 or 2 showing the components on a printed circuit board and a housing of the IMU.
Figure 3B:
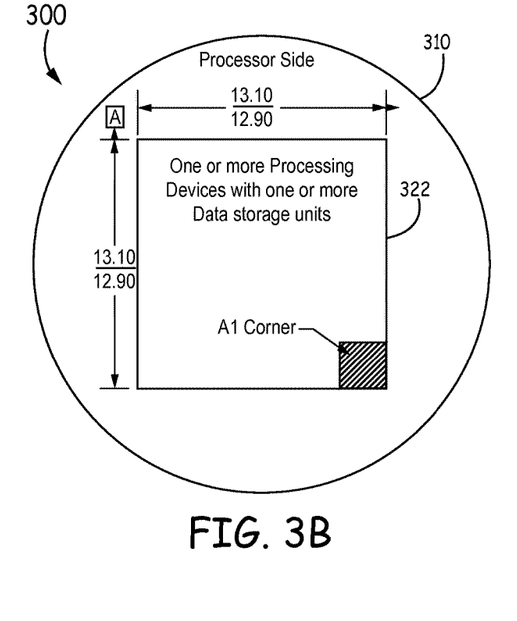
Figure 3C:
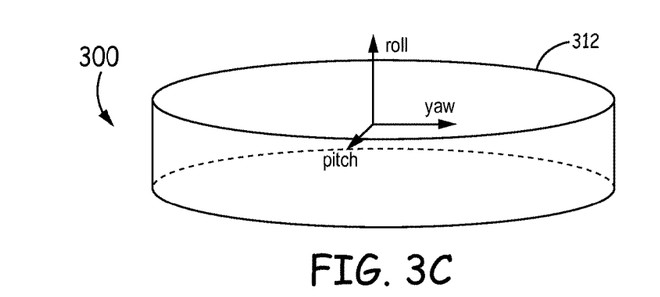

FIGS. 3A-3C are example diagrams showing components of an IMU 300 which could be either IMU 100 or IMU 200 or both. As shown the IMU 300 includes a printed circuit board 310 having two gyroscope dies 302, 304, an accelerometer die 306, and a magnetometer die 308 mounted on a first side thereof. As should be understood, in other examples, other number of gyroscope die(s), accelerometer die(s), and magnetometer die(s) can be used. The printed circuit board 310 can be mounted inside a housing 312 (shown in FIG. 3C). In an example, the gyroscope dies 302, 304, accelerometer die 306, and magnetometer die 308 are mounted on the first side (shown in FIG. 3A) of the printed circuit board 310 and one or more die 322 having one or more processing devices along with one or more data storage devices thereon are mounted on the reverse side (shown in FIG. 3B) of the printed circuit board 310. The one or more data storage devices can include instructions which, when executed by the one or more processing devices cause the one or more processing devices to implement the functionality of the IMUs 100, 200 described above in order to measure a high rate of rotation about the input axis 112, 212.

Figure 4:
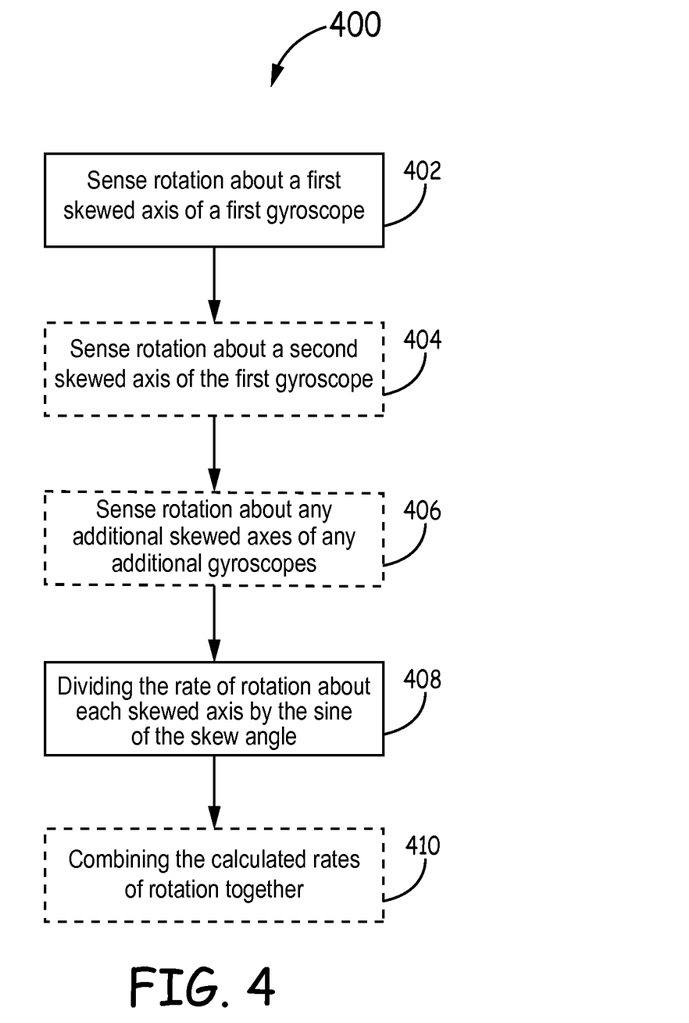
FIG. 4 is a flow diagram of a method of determining a rotation rate higher than the maximum rated rotation rate of the skewed gyroscopes of FIG. 1 or 2.

FIG. 4 is a flow diagram of an example method 400 of determining a rotation about an input axis 112, 212 using an IMU 100, 200, having one or more gyroscopes 104, 202, 204 disposed in a skewed relationship with respect to the input axis 112, 212. As described above the one or more gyroscope dies 104, 202, 204 are three dimensional (e.g., tri-axis) sensors configured to sense rotation about each of three mutually orthogonal axes.

The method 400 includes sensing a rotation about a first axis 118 of the gyroscope 104, 204 (block 402), wherein the first axis 118 is an axis of the gyroscope 104, 204 that is oriented at the skew angle 120, 220 with respect to the reference plane 124, 224. In examples where the gyroscope 104, 204 is oriented such that both a second axis 116 and the first axis 118 are oriented at the skew angle 120, 220 with respect to the reference plane 124, 224, a rotation about the second axis 116 can also be sensed (block 404). A rotation about the third axis 114 can also be sensed and used for other purposes, but in this example, it does not help measure a high rate of rotation about the input axis 112, 212.

In examples where multiple gyroscopes 102, 104, 202, 204 are used, rotation can be sensed with each of the additional gyroscopes 102, 202 (block 406). For example, if such an additional gyroscope 102 is disposed such that one of its axes 122 is parallel with the input axis 112, rotation about the axis 122 that is parallel with the input axis 112 can be sensed, however, this measurement cannot be used to determine a high rate of rotation about the input axis 112. If such an additional gyroscope 202 is disposed in a skewed relationship with the input axis 212, rotation can be sensed with one or two of the axes of the additional gyroscope die 202 in the manner described above with respect to blocks 402 and 404. In total, with two gyroscopes 202, 204 disposed in a skewed relationship with the input axis, high rotation rate measurements from up to four gyroscope axis can be obtained.

Once rotation about the respective axes is sensed, one or more processing devices in the IMU 100, 200 can calculate the rate of rotation about the input axis 112, 212 based on the sensed rotations by the gyroscopes 102, 104, 202, 204. In an example where one axis 118 of one gyroscope 104 is skewed with respect to the reference plane 124, calculating the rate of rotation about the input axis 112 can include dividing the rate of rotation about the first axis 118 (i.e., the axis that is at the skew angle 120) of the gyroscope 104 by the sine of the skew angle in degrees (block 408). The result of this calculation is the rate of rotation about the input axis 112.

In an example where two axes 116, 118 of one gyroscope are skewed at the skew angle 120 with respect to the reference plane 124, calculating the rate of rotation about the input axis 112 can include calculating a first rate of rotation by dividing the rate of rotation about a first skewed axis 118 of the gyroscope 104 by the sine of the skew angle in degrees and calculating a second rate of rotation by dividing the rate of rotation about a second skewed axis 116 of the gyroscope 104 by the sine of the skew angle in degrees (block 408). The input rate of rotation can then be calculated by combining (e.g., averaging) the first rate of rotation with the second rate of rotation, making sure to take into account any sign differences in implementations when the two axes 116, 118 are on opposite sides of the reference plane 124 (block 410).

In an example, where multiple gyroscopes 202, 204 have one or more axes that are skewed at the skew angle 120 with respect to the reference plane 224, calculating the rate of rotation about the input axis 212 can include calculating a respective rate of rotation for each skewed axis (block 408), and then combining (e.g., averaging) all the rates of rotation together (taking into account any sign differences) to determine the rate of rotation for the input axis 212 (block 410). It should be understood that the multiple gyroscopes can include two, three, four, or more gyroscopes each having one or more axes that are skewed.

In some examples, further processing on the determined rate of rotation for the input axis 212 may be performed as known to those skilled in the art, before the rate of rotation is output from the IMU 100.

It should be understood that the designations of "roll", "pitch", and "yaw" for the axes of the respective gyroscope dies 102, 104, 202, 204 are exemplary only. Therefore, in some implementations, the "pitch" or "yaw" axis as designated in the given implementation may be oriented and used as has been described herein for the "roll" axis 114, 214. That is, the "pitch" or "yaw" axis as designated in a given implementation can be oriented at the skew angle with respect to the first/desired axis, and the rotation about the first/desired axis can be determined using the method 400 above by replacing the "roll" axis as described herein with the "pitch" or "yaw" axis respectively. Other corresponding replacements between the "roll", "pitch", and "yaw" axes would also occur.

EXAMPLE EMBODIMENTS

Example 1 includes an inertial measurement unit (IMU) for measuring an input rate of rotation about an input axis, the IMU comprising: a first three dimensional gyroscope, the first gyroscope configured to sense rotation about a first set of three mutually orthogonal axes, wherein the first gyroscope is disposed such that a first axis of the first set of three axes is oriented at a skew angle in degrees away from a reference plane, the reference plane normal to the input axis; one or more processing devices coupled to the first gyroscope; and one or more data storage devices coupled to the one or more processing devices, the one or more data storage devices including instructions which, when executed by the one or more processing devices, cause the one or more processing devices to calculate the input rate of rotation based on dividing a sensed rate of rotation about the first axis by the sine of the skew angle.

Example 2 includes the IMU of Example 1, wherein a skew constant is equal to a maximum rate of rotation that the first gyroscope is rated to sense about the first axis divided by a maximum rate of rotation that is to be measured about the input axis, wherein the skew angle is an angle less than or equal to the arcsine of the skew constant.

Example 3 includes the IMU of any of Examples 1-2, comprising: a printed circuit board disposed to align with the reference plane, wherein the first gyroscope is mounted on the printed circuit board at the skew angle with respect to the printed circuit board.

Example 4 includes the IMU of Example 3, comprising a wedge disposed between the printed circuit board and the first gyroscope to dispose the first gyroscope at the skew angle with respect to the printed circuit board.

Example 5 includes the IMU of any of Examples 1-2, comprising: a housing; and a printed circuit board mounted in the housing, the first gyroscope mounted to the printed circuit board, wherein the printed circuit board is mounted at the skew angle with respect to the reference plane.

Example 6 includes the IMU of any of Examples 1-5, comprising: a second three dimensional gyroscope, the second gyroscope being rated to sense rotation about a second set of three mutually orthogonal axes, wherein the second gyroscope is disposed such that a second axis of the second set of three axes is oriented at a skew angle in degrees away from the reference plane, wherein the sensed rate of rotation about the first axis divided by the sine of the skew angle is a first rate of rotation, wherein the instructions cause the one or more processing devices to calculate a second rate of rotation based on dividing a sensed rate of rotation about the second axis by the sine of the skew angle, and to calculate the input rate of rotation based on combining the first rate of rotation with the second rate of rotation.

Example 7 includes the IMU of Example 6, wherein the second gyroscope is oriented such that the second axis is oriented in generally the opposite direction of the first axis of the first gyroscope, such that combining the first rate of rotation and the second rate of rotation cancels out common mode errors.

Example 8 includes the IMU of any of Examples 1-7, wherein the first gyroscope is disposed such that a third axis of the first set of three axes is oriented at the skew angle in degrees away from the reference plane; wherein the sensed rate of rotation about the first axis divided by the sine of the skew angle is a first rate of rotation, wherein the instructions cause the one or more processing devices to calculate a third rate of rotation based on dividing a sensed rate of rotation about the third axis by the sine of the skew angle, and to calculate the input rate of rotation based on combining the first rate of rotation with the third rate of rotation.

Example 9 includes a method of determining an input rate of rotation about an input axis, the method comprising:

sensing a first rate of rotation about a first axis of a first three dimensional gyroscope, the first gyroscope configured to sense rotation about a first set of three mutually orthogonal axes, wherein the first axis is in the first set of three axes, wherein the first gyroscope is disposed such that the first axis is oriented at a skew angle in degrees away from a reference plane, the reference plane normal to the input axis; and calculating the input rate of rotation based on dividing the first rate of rotation by the sine of the skew angle.

Example 10 includes the method of Example 9, wherein a skew constant is equal to a maximum rate of rotation that the first gyroscope is rated to sense about the first axis divided by a maximum rate of rotation that is to be measured about the input axis, wherein the skew angle is an angle less than or equal to the arcsine of the skew constant.

Example 11 includes the method of any of Examples 9-10, wherein calculating the input rate of rotation includes setting the input rate of rotation equal to the first rate of rotation divided by the sine of the skew angle.

Example 12 includes the method of any of Examples 9-11, comprising: sensing a second rate of rotation about a second axis of a second three dimensional gyroscope, the second gyroscope configured to sense rotation about a second set of three mutually orthogonal axes, wherein the second axis is in the second set of three axes, wherein the second gyroscope is disposed such that the second axis is oriented at the skew angle in degrees away from the reference plane; wherein calculating the input rate of rotation includes: calculating a second rate of rotation based on dividing the second rate of rotation by the sine of the skew angle; and calculating the input rate of rotation based on combining the first rate of rotation with the second rate of rotation.

Example 13 includes the method of Example 12, wherein the second gyroscope is oriented such that the second axis is oriented in generally the opposite direction of the first axis of the first gyroscope, such that combining the first rate of rotation and the second rate of rotation cancels out common mode errors.

Example 14 includes the method of any of Examples 9-13, comprising: sensing a third rate of rotation about a third axis of the first set of three axes of the first gyroscope, wherein the first gyroscope is configured such that the third axis is oriented at the skew angle in degrees away from the reference plane; wherein calculating the input rate or rotation includes: calculating a third rate of rotation based on dividing the third rate of rotation by the sine of the skew angle; and calculating the input rate of rotation based on combining the first rate of rotation with the third rate of rotation.

Example 15 includes an inertial measurement unit (IMU) for measuring an input rate of rotation about an input axis, the IMU comprising: a housing; a printed circuit board mounted in the housing; a first three dimensional gyroscope die mounted to the printed circuit board, the first gyroscope die configured to sense rotation about a first set of three mutually orthogonal axes, wherein the first gyroscope die is disposed such that a first axis of the first set of three axes is oriented at a skew angle in degrees away from a reference plane, the reference plan normal to the input axis; a second three dimensional gyroscope die mounted to the printed circuit board, the second gyroscope die configured to sense rotation about a second set of three mutually orthogonal axes; one or more processing devices mounted to the printed circuit board and coupled to the first gyroscope die and the second gyroscope die; and one or more data storage devices coupled to the one or more processing devices, the one or more data storage devices, including instructions which, when executed by the one or more processing devices, cause the one or more processing devices to: calculate a first rate of rotation by dividing a sensed rate of rotation about the first axis by the sine of the skew angle; and calculate the input rate of rotation based on the first rate of rotation and on a sensed rate of rotation by the second gyroscope about a second axis of the second set of three mutually orthogonal axes.

Example 16 includes the IMU of Example 15, wherein a skew constant is equal to a maximum rate of rotation that the first gyroscope is rated to sense about the first axis divided by a maximum rate of rotation that is to be measured about the input axis, wherein the skew angle is an angle less than or equal to the arcsine of the skew constant.

Example 17 includes the IMU of any of Examples 15-16, wherein the second gyroscope die is disposed such that the second axis is parallel with the reference plane.

Example 18 includes the IMU of any of Examples 15-17, wherein the second gyroscope die is oriented such that the second axis is oriented at the skew angle in degrees away from the reference plane, wherein the instructions cause the one or more processing devices to: calculate a second rate of rotation based on dividing the sensed rate of rotation about the second axis by the sine of the skew angle; wherein calculate the input rate of rotation includes combining the first rate of rotation with the second rate of rotation.

Example 19 includes the IMU of Example 18, wherein the second gyroscope die is oriented such that the second axis is oriented in generally the opposite direction of the first axis of the first gyroscope die, such that combining the first rate of rotation and the second rate of rotation cancels out common mode errors.

Example 20 includes the IMU of any of Examples 15-19, wherein the first gyroscope die is disposed such that a third axis of the first set of three axes is oriented at the skew angle in degrees away from the reference plane; wherein the instructions cause the one or more processing devices to: calculate a third rate of rotation based on dividing a sensed rate of rotation about the third axis by the sine of the skew angle; wherein calculate the input rate of rotation includes combining the first rate of rotation with the third rate of rotation.

The invention claimed is:

1. An inertial measurement unit (IMU) for measuring an input rate of rotation about an input axis, the IMU comprising:
a first three dimensional gyroscope, the first gyroscope configured to sense rotation about a first set of three mutually orthogonal axes, wherein the first gyroscope is disposed such that a first axis of the first set of three axes is oriented at a skew angle in degrees away from a reference plane, the reference plane normal to the input axis;
a second three dimensional gyroscope, the second gyroscope having one of its axes parallel to the input axis;
wherein a skew constant is equal to a maximum rate of rotation that the first gyroscope is rated to sense about the first axis divided by a maximum rate of rotation that is to be measured about the input axis;
wherein the skew angle is an angle less than or equal to the arcsine of the skew constant;
one or more processing devices coupled to the first gyroscope and the second gyroscope; and
one or more data storage devices coupled to the one or more processing devices, the one or more data storage devices including instructions which, when executed by the one or more processing devices, cause the one or more processing devices to calculate the input rate of rotation based on dividing a sensed rate of rotation about the first axis by the sine of the skew angle.

2. The IMU of claim 1, comprising:
a printed circuit board disposed to align with the reference plane, wherein the first gyroscope is mounted on the printed circuit board at the skew angle with respect to the printed circuit board.

3. The IMU of claim 2, comprising a wedge disposed between the printed circuit board and the first gyroscope to dispose the first gyroscope at the skew angle with respect to the printed circuit board.

4. The IMU of claim 1, comprising:
a housing; and
a printed circuit board mounted in the housing, the first gyroscope mounted to the printed circuit board, wherein the printed circuit board is mounted at the skew angle with respect to the reference plane.

5. The IMU of claim 1, wherein the first gyroscope is disposed such that a second axis of the first set of three axes is oriented at the skew angle in degrees away from the reference plane;
wherein the sensed rate of rotation about the first axis divided by the sine of the skew angle is a first rate of rotation about the input axis; and
wherein the instructions cause the one or more processing devices to calculate a second rate of rotation based on dividing a sensed rate of rotation about the second axis by the sine of the skew angle, and to calculate the input rate of rotation based on combining the first rate of rotation with the second rate of rotation.

6. A method of determining an input rate of rotation about an input axis, the method comprising:
sensing a first rate of rotation about a first axis of a first three dimensional gyroscope, the first gyroscope configured to sense rotation about a first set of three mutually orthogonal axes, wherein the first axis is in the first set of three axes, wherein the first gyroscope is disposed such that the first axis is oriented at a skew angle in degrees away from a reference plane, the reference plane normal to the input axis;
sensing a second rate of rotation about an axis (122), parallel to the input axis (112), of a second three dimensional gyroscope configured to sense rotation about a second set of three mutually orthogonal axes, wherein the second gyroscope is disposed such that a second axis of the second set of three axes is oriented at the skew angle in degrees away from the reference plane;
calculating the input rate of rotation based on dividing the first rate of rotation by the sine of the skew angle;
wherein a skew constant is equal to a maximum rate of rotation that the first gyroscope is configured to sense about the first axis divided by a maximum rate of rotation that is to be measured about the input axis, and wherein the skew angle is an angle less than or equal to the arcsine of the skew constant.

7. The method of claim 6, wherein calculating the input rate of rotation includes setting the input rate of rotation equal to the first rate of rotation divided by the sine of the skew angle.

8. The method of claim 6, wherein the second gyroscope is oriented such that the second axis is oriented in generally the opposite direction of the first axis of the first gyroscope, such that combining the first rate of rotation and the second rate of rotation cancels out common mode errors.

9. The method of claim 6, comprising:
sensing a second rate of rotation about a second axis of the first set of three axes of the first gyroscope, wherein the first gyroscope is configured such that the second axis is oriented at the skew angle in degrees away from the reference plane;
wherein calculating the input rate or rotation includes:
calculating a second rate of rotation based on dividing the second rate of rotation by the sine of the skew angle; and
calculating the input rate of rotation based on combining the first rate of rotation with the second rate of rotation.

10. An inertial measurement unit (IMU) for measuring an input rate of rotation about an input axis, the IMU comprising:
a housing;
a printed circuit board mounted in the housing;
a first three dimensional gyroscope die mounted to the printed circuit board, the first gyroscope die configured to sense rotation about a first set of three mutually orthogonal axes, wherein the first gyroscope die is disposed such that a first axis of the first set of three axes is oriented at a skew angle in degrees away from a reference plane, the reference plan normal to the input axis;
a second three dimensional gyroscope die mounted to the printed circuit board, the second gyroscope die configured to sense rotation about a second set of three mutually orthogonal axes, and wherein the second gyroscope die is oriented such that the second axis is oriented at the skew angle in degrees away from the reference plane;
wherein a skew constant is equal to a maximum rate of rotation that the first gyroscope die is rated to sense about the first axis divided by a maximum rate of rotation that is to be measured about the input axis;
wherein the skew angle is an angle less than or equal to the arcsine of the skew constant;
one or more processing devices mounted to the printed circuit board and coupled to the first gyroscope die and the second gyroscope die; and
one or more data storage devices coupled to the one or more processing devices, the one or more data storage devices, including instructions which, when executed by the one or more processing devices, cause the one or more processing devices to:
calculate a first rate of rotation by dividing a sensed rate of rotation about the first axis by the sine of the skew angle;
calculate a second rate of rotation based on dividing the sensed rate of rotation about the second axis by the sine of the skew angle;
wherein calculate the input rate of rotation includes combining the first rate of rotation with the second rate of rotation.

11. The IMU of claim 10, wherein the second gyroscope die is disposed such that the second axis is parallel with the reference plane.

12. The IMU of claim 10, wherein the second gyroscope die is oriented such that the second axis is oriented in generally the opposite direction of the first axis of the first gyroscope die, such that combining the first rate of rotation and the second rate of rotation cancels out common mode errors.

13. The IMU of claim 10, wherein the first gyroscope die is disposed such that a third axis of the first set of three axes is oriented at the skew angle in degrees away from the reference plane;
   wherein the instructions cause the one or more processing devices to:
      calculate a third rate of rotation based on dividing a sensed rate of rotation about the third axis by the sine of the skew angle;
      wherein calculate the input rate of rotation includes combining the first rate of rotation with the third rate of rotation.

14. An inertial measurement unit (IMU) for measuring an input rate of rotation about an input axis, the IMU comprising:
   a first three dimensional gyroscope, the first gyroscope configured to sense rotation about a first set of three mutually orthogonal axes, wherein the first gyroscope is disposed such that a first axis of the first set of three axes is oriented at a skew angle in degrees away from a reference plane, the reference plane normal to the input axis;
   a second three dimensional gyroscope, the second gyroscope configured to sense rotation about a second set of three mutually orthogonal axes, wherein the second gyroscope is disposed such that a second axis of the second set of three axes is oriented at the skew angle in degrees away from the reference plane;
   wherein a skew constant is equal to a maximum rate of rotation that the first gyroscope is rated to sense about the first axis divided by a maximum rate of rotation that is to be measured about the input axis;
   wherein the skew angle is an angle less than or equal to the arcsine of the skew constant;
   wherein the sensed rate of rotation by the first axis divided by the sine of the skew angle is a first rate of rotation about the input axis;
   one or more processing devices coupled to the first gyroscope and the second gyroscope; and
   one or more data storage devices coupled to the one or more processing devices, the one or more data storage devices including instructions which, when executed by the one or more processing devices, cause the one or more processing devices to calculate the input rate of rotation about the input axis based on dividing a sensed rate of rotation about the first axis by the sine of the skew angle; and
   wherein the instructions cause the one or more processing devices to calculate a second rate of rotation based on dividing a sensed rate of rotation about the second axis by the sine of the skew angle, and to calculate the input rate of rotation based on combining the first rate of rotation with the second rate of rotation.

15. The IMU of claim 14, wherein the second gyroscope is oriented such that the second axis is oriented in generally the opposite direction of the first axis of the first gyroscope, such that combining the first rate of rotation and the second rate of rotation cancels out common mode errors.

\* \* \* \* \*